United States Patent
Dixon et al.

(10) Patent No.: US 10,558,941 B2
(45) Date of Patent: Feb. 11, 2020

(54) RECEPTACLE FOR DETECTING DELIVERY AND RETRIEVAL EVENTS

(71) Applicant: United States Postal Service, Washington, DC (US)

(72) Inventors: Robert E. Dixon, Washington, DC (US); Ryan Luckay, Washington, DC (US)

(73) Assignee: United States Postal Service, Washington, DC (US)

( * ) Notice: Subject to any disclaimer, the term of this patent is extended or adjusted under 35 U.S.C. 154(b) by 194 days.

(21) Appl. No.: 15/466,475

(22) Filed: Mar. 22, 2017

(65) Prior Publication Data
US 2017/0278063 A1    Sep. 28, 2017

Related U.S. Application Data

(60) Provisional application No. 62/312,323, filed on Mar. 23, 2016.

(51) Int. Cl.
*A47G 29/14* (2006.01)
*G06K 7/14* (2006.01)
(Continued)

(52) U.S. Cl.
CPC ....... *G06Q 10/0836* (2013.01); *A47G 29/141* (2013.01); *G06K 7/1413* (2013.01);
(Continued)

(58) Field of Classification Search
CPC .......... G06Q 10/0836; A47G 2029/149; A47G 2029/146; A47G 29/141;
(Continued)

(56) References Cited

U.S. PATENT DOCUMENTS

| | | |
|---|---|---|
| 5,385,265 A | 1/1995 | Schlamp |
| 6,010,064 A | 1/2000 | Umeda et al. |

(Continued)

FOREIGN PATENT DOCUMENTS

| | | |
|---|---|---|
| AU | 2011224030 A1 | 10/2011 |
| DE | 10 2006 047 797 A1 | 4/2008 |

(Continued)

OTHER PUBLICATIONS

Sebastian, B. Dec. 2015. "Intelligent Mailbox System with Automatic Delivery Notification" <https://pdfs.semanticscholar.org/d8fd/ff82b1c6f2bee2ed9223b0a924c147ce6b80.pdf> (Year: 2015).*

(Continued)

*Primary Examiner* — Daniel Vetter
*Assistant Examiner* — Manal A. Alsamiri
(74) *Attorney, Agent, or Firm* — Knobbe Martens Olson & Bear LLP

(57) ABSTRACT

A receptacle for detecting delivery and retrieval events has a door sensor, an item sensor, a scanner, and a control unit for operating the sensors, and transmitting the sensor information for processing and analysis. A system can determine whether an event was a delivery or retrieval event based on sensor information and item tracking information. A system can further include an item configured to interact with a computing device.

15 Claims, 9 Drawing Sheets

(51) Int. Cl.
*G06K 19/06* (2006.01)
*G06Q 10/08* (2012.01)

(52) U.S. Cl.
CPC .. *G06K 19/06028* (2013.01); *A47G 2029/145* (2013.01); *A47G 2029/146* (2013.01); *A47G 2029/149* (2013.01); *G06K 2019/06253* (2013.01)

(58) Field of Classification Search
CPC ... G06K 2019/06253; G06K 19/06028; G06K 7/1413
See application file for complete search history.

(56) References Cited

U.S. PATENT DOCUMENTS

| | | | |
|---|---|---|---|
| 6,845,909 B2 | 1/2005 | Bong et al. | |
| 7,133,743 B2 | 11/2006 | Tilles et al. | |
| 7,337,944 B2 | 3/2008 | Devar | |
| 9,052,992 B2 | 6/2015 | Irwin et al. | |
| 9,223,315 B2* | 12/2015 | Irwin | G05D 3/00 |
| 10,074,068 B2 | 9/2018 | Irwin et al. | |
| 2002/0035515 A1 | 3/2002 | Moreno | |
| 2002/0080030 A1 | 6/2002 | Inomata | |
| 2002/0147525 A1 | 10/2002 | Cayne et al. | |
| 2002/0156645 A1 | 10/2002 | Hansen | |
| 2003/0025590 A1 | 2/2003 | Gokcebay et al. | |
| 2004/0199284 A1 | 10/2004 | Hara | |
| 2005/0040931 A1 | 2/2005 | Yasuhiro | |
| 2005/0040932 A1 | 2/2005 | Cayne et al. | |
| 2005/0068178 A1 | 3/2005 | Lee et al. | |
| 2005/0083176 A1 | 4/2005 | Yamada | |
| 2005/0179349 A1 | 8/2005 | Booth et al. | |
| 2006/0020366 A1 | 1/2006 | Bloom | |
| 2006/0080133 A1 | 4/2006 | Das et al. | |
| 2006/0138220 A1 | 6/2006 | Persky | |
| 2008/0128444 A1 | 6/2008 | Schininger et al. | |
| 2009/0015400 A1* | 1/2009 | Breed | B60C 11/24 340/539.22 |
| 2009/0015405 A1* | 1/2009 | DiPoala | G08B 13/08 340/556 |
| 2009/0187274 A1 | 7/2009 | Higham | |
| 2012/0062362 A1 | 3/2012 | Ruddock et al. | |
| 2012/0086314 A1 | 4/2012 | Bourke et al. | |
| 2012/0089530 A1 | 4/2012 | Klingenberg et al. | |
| 2012/0326840 A1 | 12/2012 | Frankenberg et al. | |
| 2013/0144428 A1 | 6/2013 | Irwin et al. | |
| 2013/0166060 A1 | 6/2013 | Irwin et al. | |
| 2013/0166067 A1 | 6/2013 | Irwin et al. | |
| 2013/0338822 A1 | 12/2013 | Gibson, Jr. et al. | |
| 2014/0203076 A1 | 7/2014 | Amdahl et al. | |
| 2014/0330603 A1* | 11/2014 | Corder | G06Q 10/0631 705/7.12 |
| 2015/0145642 A1 | 5/2015 | Rutledge et al. | |
| 2015/0254248 A1 | 9/2015 | Burns et al. | |
| 2015/0310381 A1 | 10/2015 | Lyman | |
| 2015/0371187 A1 | 12/2015 | Irwin et al. | |
| 2017/0091710 A1* | 3/2017 | Van Dyke | G06Q 10/0835 |
| 2017/0116571 A1 | 4/2017 | Tammattabattula | |

FOREIGN PATENT DOCUMENTS

| | | | | |
|---|---|---|---|---|
| EP | 1 921 586 A1 | 5/2008 | | |
| EP | 2913804 A1 | 9/2015 | | |
| JP | 2002-189797 A | 7/2002 | | |
| WO | WO 01/31827 A2 | 5/2001 | | |
| WO | WO 02/07119 A1 | 1/2002 | | |
| WO | WO 02/074634 A2 | 9/2002 | | |
| WO | WO 2015/173820 A1 | 11/2015 | | |
| WO | WO-2016138582 A1 * | 9/2016 | | G01S 17/026 |

OTHER PUBLICATIONS

International Search Report and Written Opinion dated May 22, 2017 in International Application No. PCT/US2017/023661.
International Search Report & Written Opinion dated Oct. 20, 2017 in International Application No. PCT/US2017/046093.
International Preliminary Report on Patentability dated Sep. 25, 2018 in International Application No. PCT/US2017/023661.

* cited by examiner

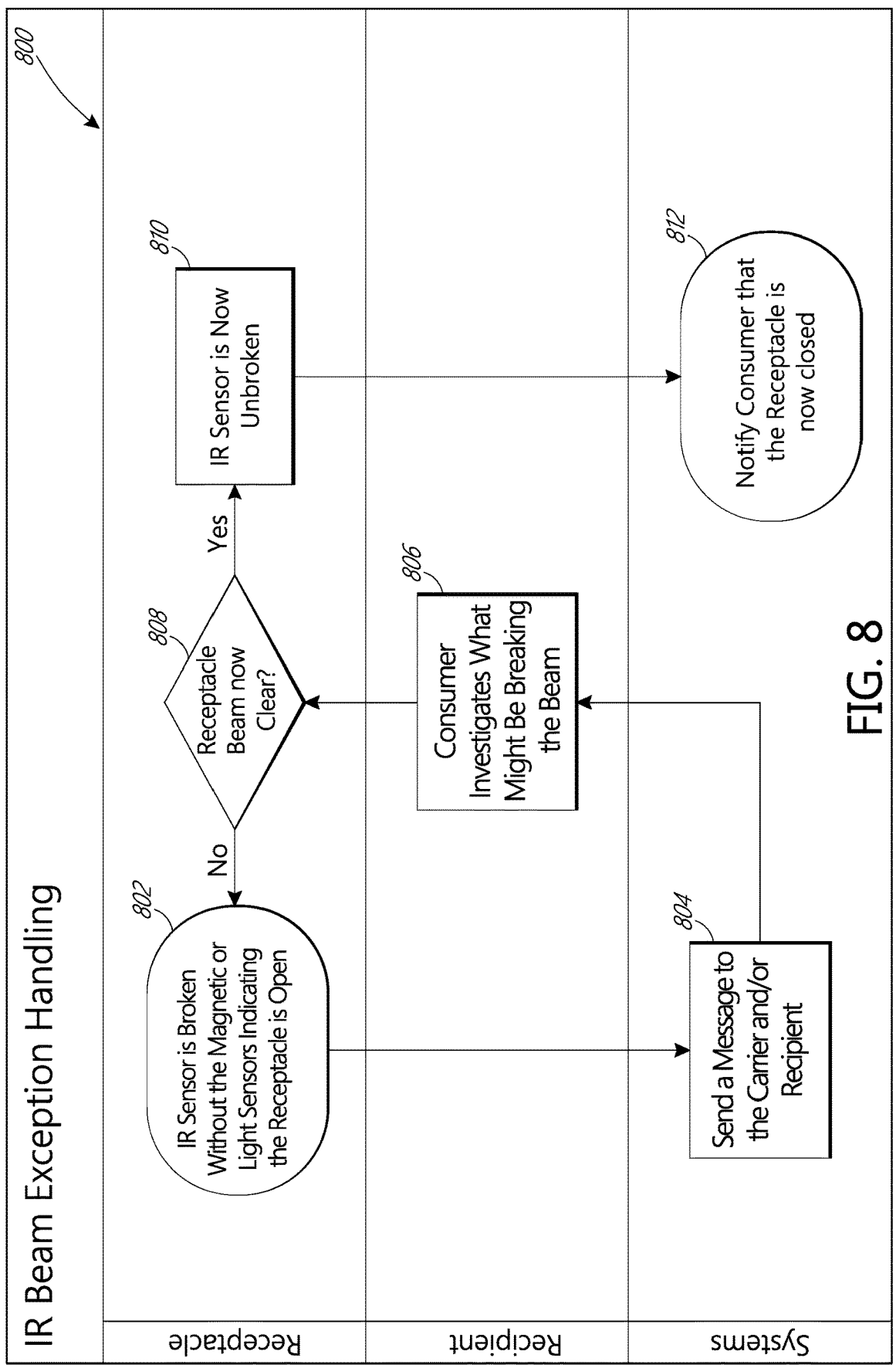

RECEPTACLE FOR DETECTING DELIVERY AND RETRIEVAL EVENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Provisional Patent Application No. 62/312,323, filed on Mar. 23, 2016, the entire contents of which are herein incorporated in their entirety.

BACKGROUND

Field

This disclosure relates to the field of transportation, delivery, and/or receipt of one or several items and to the field of communication, tracking, and control of the transportation, delivery, and/or receipt of one or several items. This disclosure also relates to an item receptacle for detecting when a delivery and/or a pick-up have occurred, to further actions to be taken upon delivery or pick-up confirmation, and interactions with physical items, such as mailpieces.

Description of the Related Technology

An item sender may wish to know when a sent item is delivered to a recipient and/or when an item has been picked up. A recipient may also wish to know when an item has been delivered and is available for pick-up. Systems and methods described herein relate to receptacles and accompanying systems to facilitate these notifications.

SUMMARY

In one aspect described herein, an item receptacle comprises a plurality of sides enclosing an internal volume; a door moveably connected to one of the plurality of sides, the door configured to open and close to allow access to the internal volume; a door sensor configured to detect when the door is opened; a processor in communication with the door sensor, the processor configured to receive a signal corresponding to a change in state of the door sensor; a communication device in communication with the processor, the communication device configured to communicate with a central hub; and wherein the processor is configured to store a change in state of the door sensor and transmit, via the communication device, the change in state of the door sensor to the central hub.

In some embodiments, the item receptacle further comprises an item sensor disposed within the internal volume, the item sensor comprising an emitter adapted to emit a beam and a detector to detect the beam, and to identify a change in state of the beam, the item sensor in communication with the processor.

In some embodiments, the processor is further configured to identify whether a delivery or pick-up event has occurred based on the change of state of the door sensor and the change of state of the item sensor.

In some embodiments, the processor is configured to store a change in state of the beam and to transmit the change in state of the beam to the central hub.

In some embodiments, the item receptacle further comprises a scanner connected to one of the plurality of sides, and disposed within the internal volume, the scanner in communication with the processor, the scanner configured to read a computer readable code on an item within the internal volume.

In some embodiments, the processor is configured to instruct the scanner to scan the internal volume to read the computer readable code on the item disposed within the internal volume.

In some embodiments, the processor is further configured to identify whether a delivery or pick-up even has occurred based on the change of state of the door sensor and the reading of the computer readable code by the scanner.

In some embodiments, the processor is configured to transmit a signal indicative of the computer readable code to the central hub.

In some embodiments, the item receptacle further comprises a wireless communication device configured to communicate with an identifier tag on an item disposed within the mailbox.

In some embodiments, the item receptacle further comprises a power supply connected to the processor and the door sensor, the power supply comprising a solar panel attached to an external surface of the item receptacle.

In another aspect described herein, a method for using an item receptacle comprises, detecting, in a processor, a signal from an item sensor located on an item receptacle, wherein the item receptacle comprises: a plurality of sides enclosing an internal volume; a door comprising a door state sensor; and an item sensor; the method further comprising detecting, in a processor, a door open signal from the door state sensor; determining, in a processor, whether an item delivery or pick up event has occurred based on the detected door open signal and the detected item sensor signal; and causing a notification of a delivery event to be sent to a recipient of an item.

In some embodiments, the method further comprises causing a notification of a pick up event to be sent to a sender of the item or to a recipient of the item.

In some embodiments, the item sensor comprises an emitter configured to emit a beam of electromagnetic radiation and a detector, and the signal comprises a change in state of the beam.

In some embodiments, an item delivery event is determined when the beam changes from an uninterrupted state prior to a door open event to an interrupted state following a door open event.

In some embodiments, an item pickup event is determined when the beam changes from an interrupted state prior to a door open event to an uninterrupted state following a door open event.

In some embodiments, the item sensor comprises a scanner configured to read a computer readable code on an item within the internal volume, and wherein the signal comprises information indicative of the computer readable code read by the scanner.

In some embodiments, a delivery event is determined when the scanner reads no computer readable code prior to a door open signal is received, and reads a computer readable code after the door open signal is received.

In some embodiments, a pick-up event is determined when the scanner reads the computer readable code prior to a door open signal is received, and reads no computer readable code after the door open signal is received.

In some embodiments, the method further comprises receiving, at the processor, location and time information from a delivery device associated with a delivery resource assigned to deliver an item, detecting a time of the door open signal; determining that a delivery event occurred based on the location and time information from the delivery device and the time of the door open signal.

In another aspect, a system comprises an item receptacle comprising: a plurality of sides enclosing an internal volume; a door configured to open and close to allow and deny access to the internal volume; means for detecting a change in state of the door; means for sensing the presence of an item; means for detecting a signal from an item sensor located on an item receptacle, wherein means for determining whether an item delivery or pick up event has occurred based on the detected change in state of the door and the detected item presence; and means for causing a notification of a delivery event to be sent to a recipient of an item.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

FIG. 8 is a process flow diagram of IR beam exception handling.

DETAILED DESCRIPTION

Figure 1:
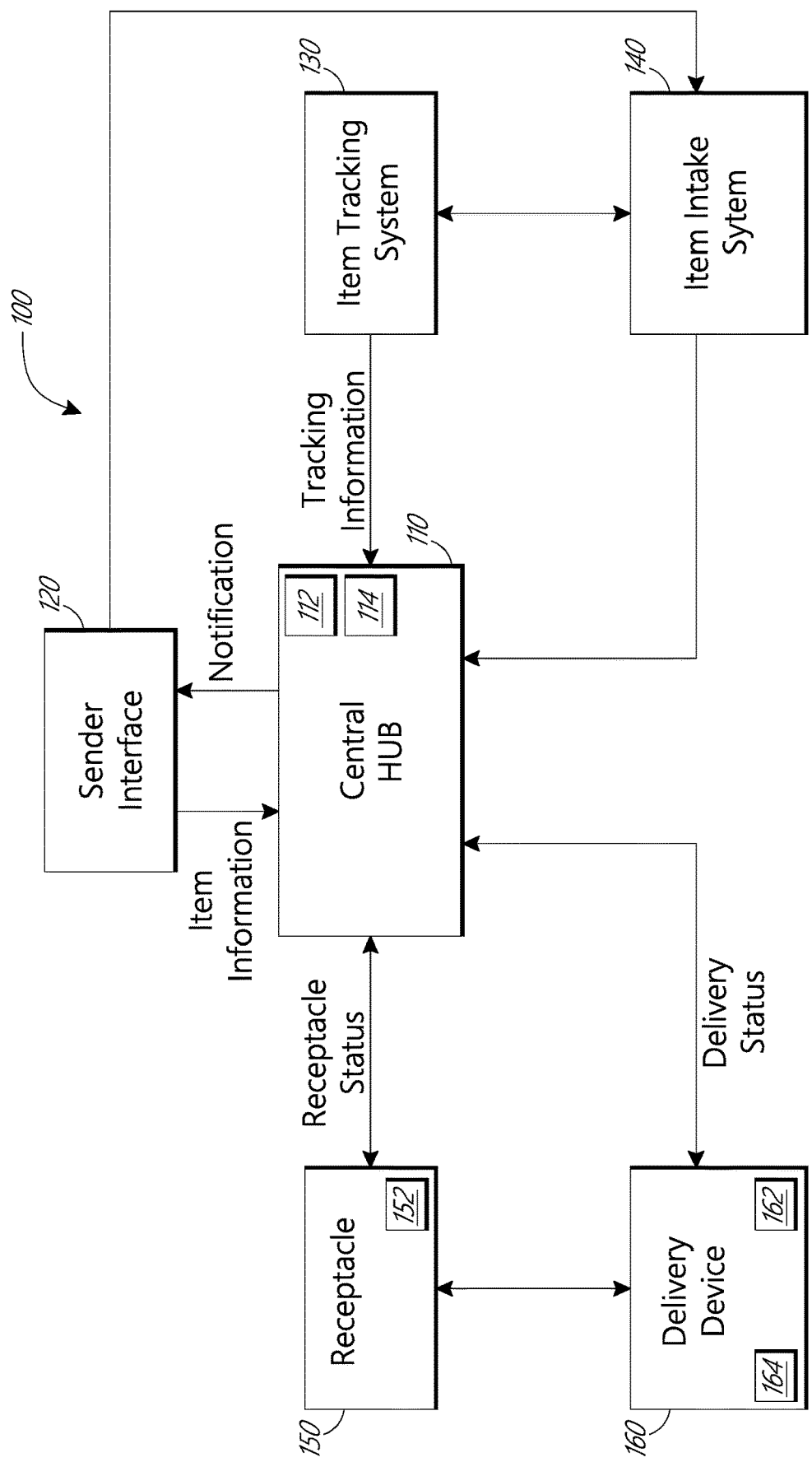
FIG. 1 is a block diagram of an embodiment of a system for facilitating delivery and pick-up actions.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Some embodiments disclosed herein relate generally to an item receptacle for use in confirming delivery and pick-up of items. The item receptacle can include sensors to determine when a receptacle door is opened, when an item is placed in or taken out of the receptacle, and when a receptacle door is closed. The item receptacle can be in communication with a central server or central database and be able to transmit and receive information related to the delivery and pick-up of items at the receptacle.

In some embodiments, the item receptacle may be part of a plurality of item receptacles in a common location. The plurality of item receptacles can share a common communication link. The item receptacle or plurality of item receptacles are in communication with a processing unit that controls scanners, detectors, sensors, and communication links for the item receptacle.

In some embodiments, an item can be a "smart" item, such as a "smart mailpiece." A smart mailpiece can have hardware and/or software embedded in the mailpiece itself, in the contents of a mailpiece, and the like. A recipient of the mailpiece, or any user, may be able to interact with the mailpiece, with additional content, and the like using a computing device.

FIG. 1 depicts a block diagram of a system for facilitating delivery and pick-up actions and other notifications. The system 100 comprises a central hub 110, a sender interface 120, an item tracking system 130, an item intake system 140, a receptacle interface 150, and a delivery device 160. The system 100 can be part of a distribution network, such as the United States Postal Service (USPS). The distribution network may own any or all of the components of the system 100, or may provide instructions, such as an API or the like to allow other entities to access the central hub 110 to either provide instructions, identify items, or obtain information about items. In some embodiments, the central hub 110 can be a single computer, a network of computers, a server, and the like. in some embodiments, the central hub 110 can be a software program that runs on a computer, a network, a server, and the like.

The central hub 110 is in communication with the sender interface 120, the item tracking system 130, the item intake system 140, the receptacle 150 and the delivery device 160. This communication can be wired or wireless communication. The central hub 110 comprises a memory 112 for storing information regarding items, including distribution items. The information stored can be that which was received from any of the other components of the system. The central database can also comprise a processor 114 configured to interface with the memory 112 and other components of the system 100, and to analyze the information in the memory 112 to generate notifications and cause further actions to occur based on the information in the memory 112.

The sender interface 120 is in electronic communication with the central hub 110 in order to transmit and receive item information and item notifications. The sender interface 120 can be embodied in a mobile computing device, a desktop computing device, can be an application running on a computing platform, a web interface, or a dedicated interface with the central hub 110. The sender interface 120 is configured to receive sender input regarding items to be sent, including an item identifier, a delivery point, and any other desired information. In some embodiments, the sender interface 120 receives item information from a sender, shipper, or mailer, the information identifying the mailpiece, and/or a unique identifier to be stored in an identifier tag, such as a RFID tag, Bluetooth low energy tag, and the like, that is located on or in the item or an identifier associated with the identifier tag. In some embodiments, including special handling instructions such as delivery times, request for delivery and pick-up confirmation, and the like. The sender interface 120 is further configured to receive additional information or content, such as a video, a coupon, an offer, an internet link, or any other additional or supplemental information. The sender interface 120 can provide the additional information to be associated with the unique identifier so a user can access the additional information from the item when it is delivered. The association between the additional information and the unique identifier of the item can be stored in the central hub 110.

The item tracking system 130 can comprise a memory and a processor, or may be a network or server, or may run as a program on another processor within the system 100. The item tracking system 130 comprises processing equipment, scanners, and databases configured to track the delivery status of each item in the distribution network. The item tracking system receives item tracking information for items moving throughout the distribution network including every scan or read of the items, to track the status, location, or position of each item in the distribution network. The item tracking system 130 sends item tracking information to the central hub 110 to update the central hub 110 regarding the delivery progress of items whose information is stored in the central hub 110.

The item intake system 140 may be a component of the item tracking system, or it may be its own system, comprising a memory and a processor and item scanning equipment. The item intake system is in communication with the sender interface 120 and can receive information regarding the induction of items from the sender into the distribution network, including when items will be physically supplied to the distribution network for induction. The item intake system 140 also communicates with the central hub 110 to inform the central database when an item is going to be, or has been, physically inducted into the distribution network. The item intake system 140 comprises item processing equipment, sorting equipment, an imager and/or a scanner, and the like. The information regarding the destination of an item can be obtained from the item using the imager and/or the scanner to read, scan, or interpret a destination or computer readable code on the item.

The receptacle 150 comprises a communication link to communicate receptacle and item status to the central database. The receptacle can comprise a control unit 152. The receptacle 150 will be described in greater detail below.

The delivery device 160 can be physically located with or associated with a delivery resource, such as a carrier, vehicle, and the like. The delivery device 160 can comprise a scanner 162 configured to read a computer readable code on an item to be delivered to the receptacle 150. The scanner can be a camera 162, a barcode scanner, an IR detector, a Bluetooth-enabled scanner, or a combination of the above. The delivery device 160 also comprises a location sensor 164 configured to provide the real-time geographic location of the delivery device 160 and to track and store the path of the delivery device 160, the data comprising information such as breadcrumb data. The location sensor 164 provides a geographic location using a global positioning system (GPS), a cellular signal, a Wi-Fi signal, or the like. The delivery device 160 is in wired or wireless electronic communication with the receptacle 150 and the central hub 110. The delivery device 160 provides delivery status information to the central hub 110. The delivery device 160 can also communicate and receive receptacle status information from the receptacle 150, including position or location information.

Figure 2:
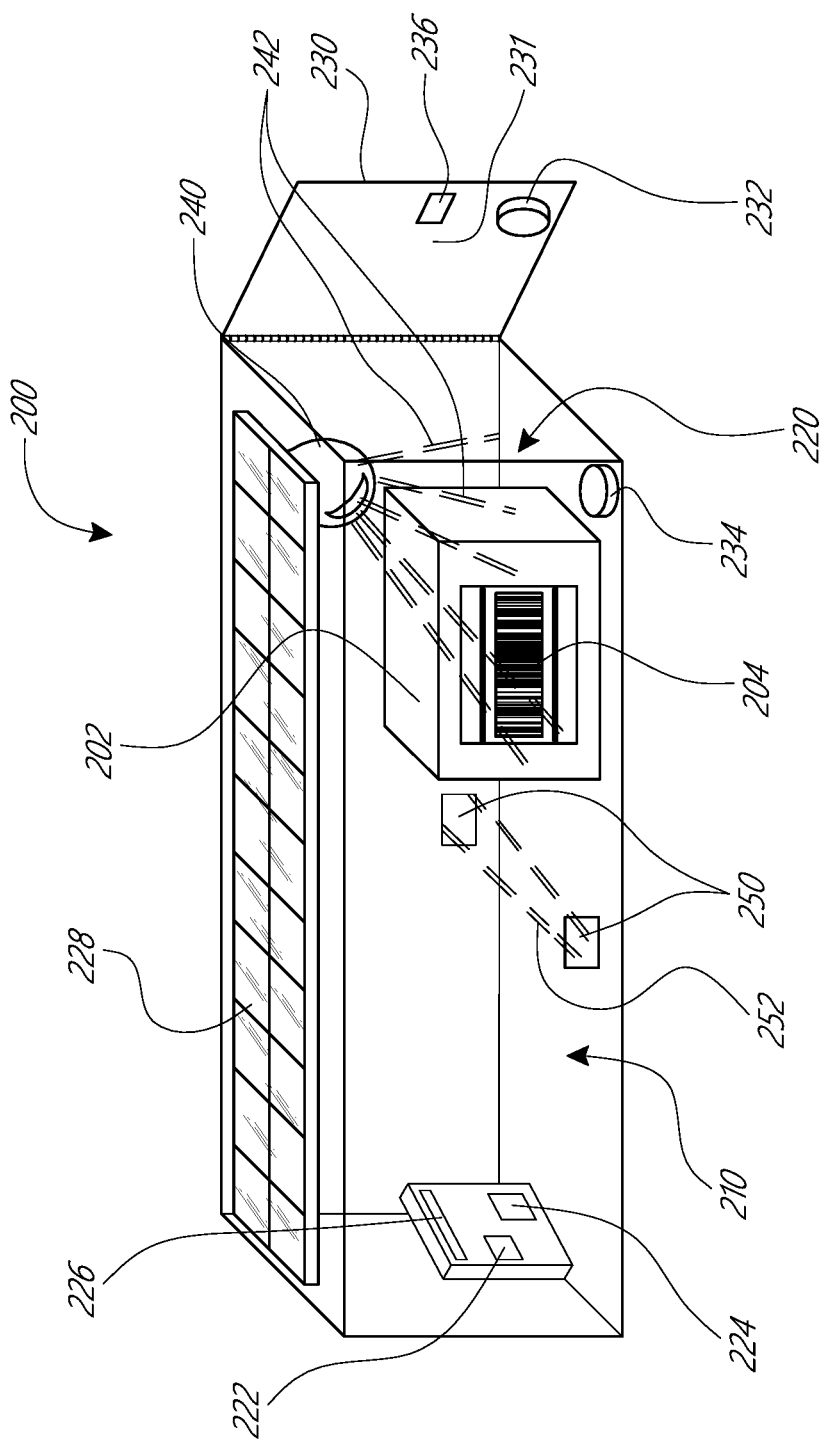
FIG. 2 is a perspective view of an embodiment of a receptacle to facilitate delivery and pick-up actions.

FIG. 2 depicts an embodiment of an item receptacle 200. The item receptacle 200 is depicted having one transparent side and a transparent top for ease of illustration. The item receptacle can be similar to the receptacle 150 described above, including having similar electronic communication configurations and capabilities. The item receptacle 200 comprises an external surface 210 and an interior volume 220 enclosed by the external surface. A portion of the external surface 210 is shown transparent for ease of discussion and illustration.

The interior volume 220 can enclose a processor 222, a power supply 224, and a wireless communication device 226. In some embodiments, the processor 222 comprises a memory containing instructions to control the processor and the other electrical components of the item receptacle 200 as will be described below. The processor 222 memory can also store information received from electronic components described herein. These components can be configured as a single unit, or can be discrete components. In some embodiments, these components can be external to the interior volume 220, and can be in a weatherproof enclosure. The power supply 224 can be connected to a solar panel 228. The solar panel 228 can be attached the top of the item receptacle 200, or can be attached to a support remote from the item receptacle 200, which is wired to the power supply 224 so as to transmit electricity to the power supply 224. The power supply 224 is in electrical connection with the processor 222 and the wireless communication device 226, as well as with other electrical components that will be described below.

In some embodiments, the power supply 224 is connected to a source of power, such as a transmission line, a plug, a building electrical system, or any other power source, as desired. For example, where the item receptacle is installed in an apartment building or the like, the power supply 224 can be connected to the building's power supply. In a remote setting, the power supply 224 can be connected to the solar panel 228. In some embodiments, such as with a cluster box unit (CBU) a common power supply 224 and processor 222 can be used for multiple item receptacles 200 or multiple internal volumes 220.

The item receptacle further comprises a door 230. The door 230 is openable to provide access to the interior volume 220. The door 230 comprises a securement feature 236, such as a lock, latch, or the like, which can securely maintain the door 230 in the closed position, and which can selectively allow access to the interior volume 220 of the item receptacle 200. The door 230 comprises a status sensor comprising a first sensor 232 disposed on an inner surface 231 of the door 230 and a second sensor 234 disposed within the interior volume 220 of the item receptacle 200. The status sensor detects the status of the door, such as whether the door is open, closed, unlocked, partially closed, left open, or other desired status. The first and second sensors 232 and 234 can be electrically powered and can return or provide an electronic signal corresponding to the door status. In some embodiments the first sensor 232 and the second sensor 234 are a magnetic sensor configured to sense whether the door 230 is open or closed depending on the magnetic coupling between the first sensor 232 and the second sensor 234. In some embodiments, the first sensor 232 and the second sensor 234 can be an electromagnetic sensing system which detects an interruption or continuity of an optical, IR, microwave, radio, or other electromagnetic signal to determine the position of the door 230.

In some embodiments, the first sensor 232 and/or the second sensor 234 are light sensors that detect light in the internal volume of the item receptacle 200. The light sensor can operate by sensing an increase in ambient light within the internal volume 220 of the item receptacle 200 that would occur when the door 230 is opened. In some embodiments, where one of the first sensor 232 and the second sensor 234 is a light sensor, the item receptacle 200 need not have another sensor. In some embodiments, the first and second sensors 232, 234 can act as a main light sensor and a backup light sensor. In some embodiments, the item receptacle has first and second sensors 232, 234 configured as magnetic sensors, and also has a light sensor.

The first and/or the second sensors 232, 234 are in electrical contact with the power supply 224, and in electronic communication with the processor 222 and/or the wireless communication device 226. The first sensor 232 and the second sensor 234 can communicate a status signal, such as a door open signal, door closed signal, or door cycle signal, including current door status signal, to the processor 222. The processor can send the signals received from the first and second sensor 232, 234 to the central hub 110 via the wireless communications device 226.

In some embodiments, for example, where a number of item receptacles 200 are located at a common place, such as at a CBU, or in an apartment building, the door 230 may be a rear door which provides a carrier access to all of the item receptacles 200 in the CBU.

The item receptacle 200 or cabinet 300 can comprise a scanner 240 disposed on or mounted on an inner surface of the item receptacle 200 as described elsewhere herein. The scanner 240 can be connected to with the power supply 224 and the processor 222. The scanner 240 is positioned to be able to scan a computer readable code 204 located on an item 202 disposed in the internal volume 220 of the item receptacle 200. The scanner can be an optical scanner, a barcode scanner, a RFID reader, near field communication, such as Bluetooth®, transceiver, and the like. In some embodiments, the scanner 240 emits electromagnetic radiation 242, such as a laser, LED light, and the like, to read the computer readable code 204 on the item and transmits the computer readable code 204, or the information encoded within the computer readable code 204 to the control unit 150. In some embodiments, more than one scanner 240 or type of scanner 240 can be positioned within the interior volume 220 of the item receptacle 200 to ensure that a computer readable code 204 can be read regardless of the orientation of the item 202 within the item receptacle 200.

The item receptacle 200 can further comprise an item sensor 250. The item sensor 250 can comprise an emitter to emit a beam 252, such as an infrared signal, a reflector, and/or a sensor to detect a reflected beam 252. The item detector can be positioned near a bottom interior surface of the item receptacle 200. In some embodiments, the item sensor 250 can be positioned on a top and/or bottom interior surface of the item receptacle 200, near the door 230. This positioning allows the item sensor 250 to detect the presence of the item 202 when the item 202 is placed or inserted into the item receptacle 220. The item 202 will interrupt the beam 252 between the emitter and the reflector and produce a signal indicative of the presence of the item 202. The item sensor 250 receives power from the power supply 224, and communicates signals indicative of the presence or absence of the item 202 to the processor 222. In some embodiments, the item sensor 250 is disposed on the side wall, back wall, or door of the receptacle such that as an item is inserted into the receptacle 200, the item will break or interrupt the beam 252, but that once the item is inserted into the receptacle 200, the item will move out of the path of the beam 252, and the beam 252 will be restored. This can happen, for example, when an item such as a mail piece is inserted at an orientation interrupting the beam 252, which item will then fall or lay flat on the bottom of the receptacle 200, out of the path of the beam 252.

The wireless communication device 226 can send information and signals to the central hub 110, such as through a cellular, WiFi, Bluetooth, or other wireless communication protocol.

In some embodiments, the components of the item receptacle, including the processor 222, the power supply 224, the wireless communication device 226, the solar panel 228, the first and second sensors 232, 234, the sensor 240, and the item sensor 250, or any combination of these components, can be provided as a kit for a retrofit of an existing item receptacle 200. For example, a user having an existing mailbox, can obtain a kit comprising these components, sized, shaped, and designed to fit a standard or custom—type mailbox, including adhesive, attachment devices, screws, cables, wires, and the like, needed for the retrofit. For example, the processor 222, the power supply 224, and the wireless communication device 226 can be a computing unit, such as a raspberry pi 3, or other similar device.

Figure 3:
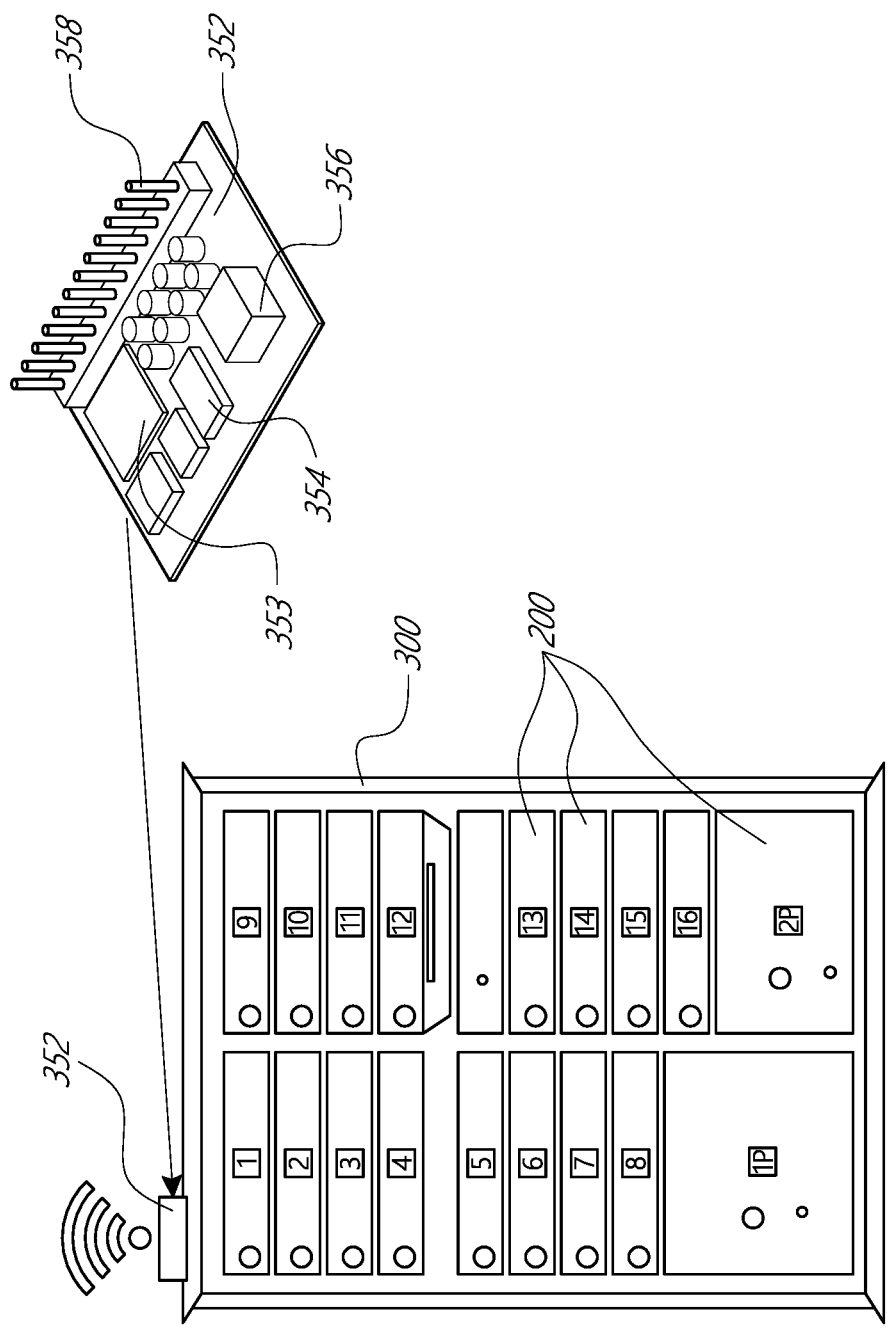
FIG. 3 is a front view of an embodiment of plurality of receptacles for facilitating delivery and pick-up actions.

FIG. 3 depicts a front view of an embodiment of a plurality of item receptacles 200 in a common location, such as in a CBU. A cabinet 300 comprises a plurality of item receptacles 200. The cabinet 300 has a control unit 352 disposed thereon. The control unit 352 comprises a power source 353, a communication feature 354, a processor 356, and a memory 358 in communication with each other. The power source 353 provides power to the control unit 352 and to the sensors and detectors on the item receptacle 200. The power source 353 can be a solar panel, a battery, or a combination of both. In some embodiments, the power source 353 can be an attachment to a power grid, generator, or other power source. The control unit 352 can be similar to the processor 222, power supply 224, and wireless communication device 226 described above, and these terms can be used interchangeably without departing from the scope of the present disclosure. Although the embodiments of FIG. 2 and FIG. 3 are different, a person of skill in the art, guided by this disclosure, will understand that the features of each can be interchanged, or referred to interchangeably, or that features described with regard to either FIG. 2 or FIG. 3 can be applied to the other figure.

The processor 354 is configured to control the operation of the sensors and detectors on the item receptacles 200, to receive the signals from the various sensors and detectors on the item receptacles 200, and to store the received signals in the memory 356. The memory 356 can also store operation instructions for directing the operation of the processor 354. The processor 354 also controls the operation of the communication feature 358.

The communication feature 358 can be a wired or wireless communication device for sending and receiving signals associated with the item receptacles 200 in the cabinet 300. The communication feature 358 can communicate via cellular 3G, 4G, LTE, or other networks. The communication feature 358 can communicate via LAN, WAN, Wi-Fi, near field communication, or any other desired method or protocol. The communication feature 358 can communicate with the central hub 110 and with the delivery device 160.

Figure 4A:
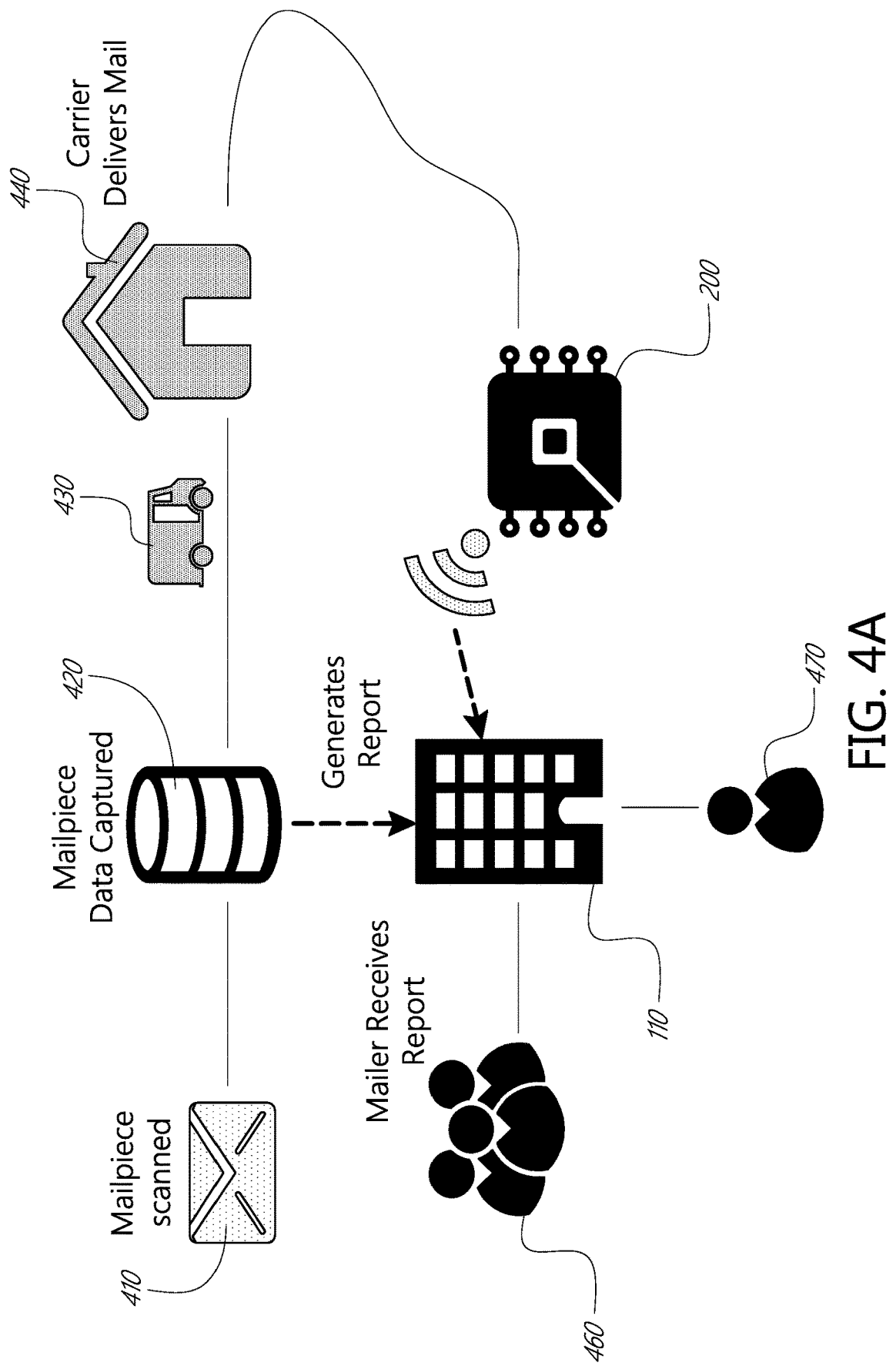
FIG. 4A is a process flow diagram for an embodiment of a delivery and pick-up system.

An exemplary embodiment of the operation of system 100 and its components will now be described with reference to FIG. 4A. FIG. 4A depicts an embodiment of a process flow diagram for the pick-up and delivery system. FIG. 4A depicts operation of the system using the USPS and a mailpiece as an example. It will be understood that the USPS example does not limit the present disclosure. As used herein, the term mailpiece can be synonymous with the term item, and can be used interchangeably therewith.

The process begins when a mailpiece 410 is generated. The mailpiece 410 is generated by a sender, shipper, or mailer. The sender creates an electronic record of the mailpiece 410. The electronic record of the mailpiece 410 includes information regarding the mailpiece including shipper ID, recipient, destination, service class, and other information. The shipper ID, recipient, destination, service class, and other information created by the sender can be encoded in a computer readable code on the mailpiece 410. The electronic record of the mailpiece 410 is submitted to the distribution network, and to the central hub 110 via the sender interface 120. The electronic record can contain a field or data entry indicating that the mailpiece 410 is to be tracked for delivery and pick-up. In some embodiments, the indication that the mailpiece 410 should be tracked for delivery and pick-up can be provided by associating an existing field in the electronic record, such as shipper identification, with the desired service in the central hub 110. Thus, the electronic record would not need to have a specific field indicating tracking delivery and pick-up is desired, but that the electronic record would include a shipper identifier which the central hub 110 recognizes as requesting delivery and tracking pick-up as described herein. In some embodiments, the computer readable code on the mailpiece can indicate that delivery and pick-up notifications are requested. This can be included in a service class or other value within the computer readable code.

The sender interface 120 can also send a signal to the item intake system 140, via the central hub 110, or directly, indicating when (day, time, etc.) the physical mailpiece 410 will be provided to a location in the distribution network, such as when the mailpiece 410 will be delivered to a post office for induction into the mailstream. The item intake system 140 communicates the intended time for delivery of the mailpiece 410 to the central hub 110. This communication can instruct the processor 114 to commence an algorithm or routine to analyze incoming data from the item tracking system 130 to identify when the mailpiece 410 is scanned on processing equipment.

The mailpiece is delivered to a post office or induction facility of the distribution network, and the mailpiece is scanned on mail processing equipment 420 where data for mailpiece 410 is captured. The data can include a computer readable code, such as an intelligent mail barcode (IMb). The captured data is stored in the memory of the item tracking system, and is sent to the central hub 110. The processor 114 analyzes the captured data and compares the captured data to the item information received from the sender interface 120. If the processor 114 identifies that the captured data corresponds to a mailpiece 410 whose item information was provided, or is intended for delivery and pick-up tracking, the captured data is stored in the memory 114. This process can repeat for each scan event on the item intake system 140, and on subsequent scans, sorting, or processing on mail processing equipment throughout the distribution network, as the mailpiece 410 moves from induction point to its intended destination. While or after being processed on the mail processing equipment 420, item information, including item induction information, can be sent to the mailer or sender who generated or is associated with the mailpiece 410.

The mailpiece 410 will arrive at a delivery hub, or at a unit or local delivery facility prior to being sent out for delivery to the final destination. The delivery hub or local delivery facility can be a local postal facility, such as where a carrier collects items for delivery along the carrier's assigned route. As the mailpiece 410 moves to the delivery hub and/or is sorted prior to going out for delivery, it is scanned by the item tracking system 130. At the delivery hub, a final sorting of the mailpiece 410 can occur. When the final sort is identified by the item tracking system 130, the tracking information is sent to the central hub 110, where the central database identifies that the mailpiece 410 is out for delivery. The central hub 110 can store the identity of all the receptacles 150 in the distribution network. When the final sort or scan identifies the mailpiece 410 is out for delivery, this can trigger the processor 114 to look for signals from the receptacle 150, via the wireless communication device 226, or the control unit 352 for the item receptacle 200 for which the mailpiece 410 is intended.

The mailpiece 410 is placed on or in a delivery resource 430, such as a vehicle, a carrier, and the like, and a record is created in the central hub 110 that the item is out for delivery. The delivery resource 430 carries the mailpiece 410 to a receptacle 200.

At the receptacle 200, the delivery resource 430 places the mailpiece 410 into the receptacle 200. the receptacle 200 will record the events associated with operating the receptacle 200 and communicate the signals to the central hub 110. The central database will then analyze the signals from the receptacle to identify whether the signals indicate a delivery. This process is described in greater detail below. The receptacle 200 or cabinet 300 sends a signal to the central hub 110 regarding delivery or pick-up of the mailpiece 410. The central hub 110 stores the signals regarding delivery or pick-up of the mailpiece 410, and stores additional information, such as date and time of pick-up, how much time elapsed between delivery of the mailpiece 410 and pick-up of the mailpiece 410 by the recipient, and the like.

In the case where a delivery event is detected, the central hub 110 can generate and send a message to a recipient 470 that the mailpiece 410 has been delivered. The message can include additional information, such as the time of delivery, place of delivery, if different from a standard address (e.g., a P.O. box, a parcel locker, and the like), or any other information the distribution network or sender would like to communicate to the recipient. The message can be sent via an email, text, phone call, via a notification from an application on a smartphone, a social media alert or update, or any other desired method.

The central hub 110 also sends information to a sender, mailer, and/or the generator 460 of the item 410. This information can include delivery confirmation, delivery date and time, delivery location, and the like.

When the receptacle or cabinet 300 detects a pick-up event, as will be described in greater detail below, the central hub 410 can send a message to the recipient 470 that the mailpiece 410 was picked up. This can be a security measure, or information to multiple residents of a household that the mail has been collected. In some embodiments, the central hub 410 can send messages to more than one person associated with a delivery location, such as one or more of the residents at a particular delivery location or address.

The central hub 110 can also send pick-up confirmation or information to the sender 460 of the mailpiece 410. In some embodiments, the central hub 110 can prepare reports for all mailpieces 410 associated with a particular mailer or sender 460. The reports can include time from induction of the mailpiece 410 to delivery and pick-up, and other desired information.

Figure 4B:
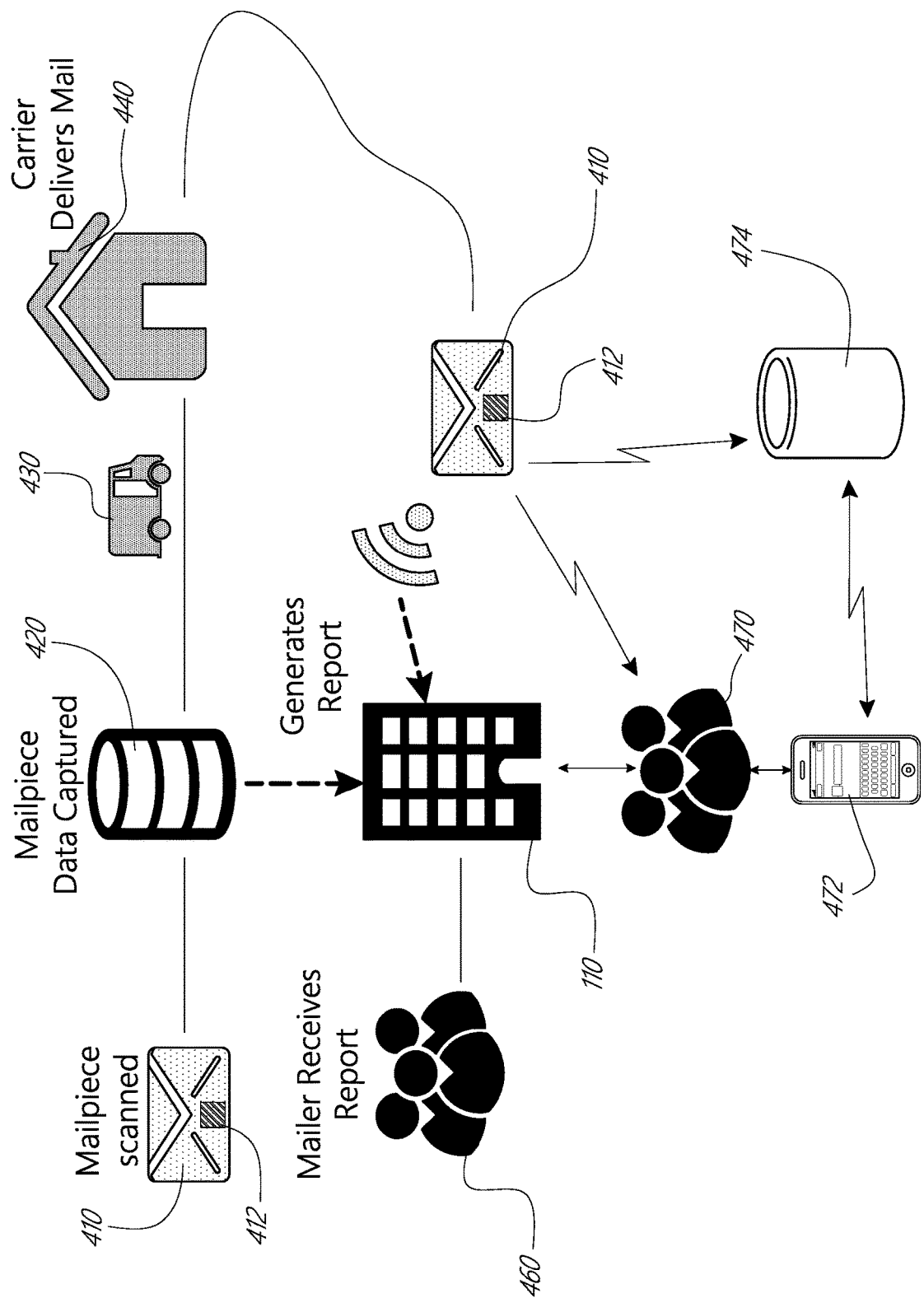
FIG. 4B is a process flow diagram for and embodiment of a pick-up and delivery system.

FIG. 4B depicts an embodiment of a process flow diagram for the pick-up and delivery system. The embodiment of FIG. 4B is similar to that depicted in FIG. 4A. The mailpiece 410 is inducted into the mailstream or the distribution network via the mail processing equipment 420, or the item intake system 140. In some embodiments, the mail processing equipment 420 is the item intake system 140 or is similar to the item intake system 140.

In some embodiments, the mailpiece 410 can comprise an identifier tag 412, such as an RFID tag, a Bluetooth tag, or other similar hardware. The identifier tag 412 stores or encodes a unique identifier, such as an alphanumeric string, a particular frequency, a Bluetooth identifier, or any other identifier. The unique identifier is associated with the mailpiece 410. The sender or mailer can supply this number to the distribution network, such as to the central hub 110. This can occur when an electronic manifest is provided to the distribution network, or can be supplied via the sender interface 120 when the mailpiece 410 is registered. In some embodiments, the item intake system 140, or the mail processing equipment 420 can read the unique identifier, and associate the unique identifier with the mailpiece 410. The association can be stored in the memory 112 to be accessed as will be described later. The mailer or sender can, via the sender interface 120, add additional content associated with the unique identifier, as will be described elsewhere herein.

After the carrier delivers the mailpiece 440 as described above, the mailpiece 410 is deposited into the item receptacle 200. In some embodiments, the mailpiece 410, within the item receptacle 200, is in proximity to the wireless communication device 226. The wireless communication device can read an RFID tag, form a Bluetooth connection, a near field communication (NFC) link, or other similar communication. In some embodiments, the mailpiece 410 interacts with the wireless communication device 226. When the wireless communication device 226 detects the mailpiece 410, the wireless communication device 226 receives the unique identifier from the identifier tag 412, the wireless communication device 226, together with the processor 222, sends a signal confirming delivery of the mailpiece 410. Similarly, after the connection with the mailpiece 410 is made, and the mailpiece 410 is removed from the item receptacle 200, the wireless communication device 226 loses the connection with the mailpiece 410. The processor 222 and the wireless communication device 226 determine that the mailpiece 410 has been removed from the item receptacle 200, or, in other words, that the mailpiece 410 has been picked up. The delivery and pickup determinations or detections can be transmitted to the central hub 110, can be transmitted to the recipient 470, and transmitted to the sender 460.

In some embodiments, when the recipient 470 picks up a mailpiece 410, the identifier tag 412 can interact with the recipient's mobile computing device 472. The mobile computing device can be, for example, a Bluetooth enabled smartphone. When the identifier tag 412 connects to the mobile computing device 472, such as via NFC, or Bluetooth, including Bluetooth 5.0 protocol, the identifier tag 412 can provide a user additional content. For example, the identifier tag 412 can provide exclusive video content, such as via an internet link, an application on the mobile computing device 412, and the like. In some embodiments, the identifier tag 412 can transmit a coupon or offer to the mobile computing device 472, or can provide a link to a website or other location where a coupon or offer can be downloaded to the mobile computing device 472. The coupon or offer can be for a company, service, or other entity associated with the mailpiece 410, or can be associated with the mailer or sender 460. In some embodiments, the recipient 470 can place the mobile computing device 472 on the mailpiece 410, and the mobile computing device 472 will display a website, a video, or other content associated with the identifier tag 412.

In some embodiments, the location of additional content is stored in the identifier tag 412 itself, which communicates the location to the mobile computing device 472. In some embodiments, the mobile computing device 472 detects or receives an identifier from the identifier tag 412, and the mobile computing device 472 communicates with the central hub 110, provides the identifier from the identifier tag 412, and the central hub 110 provides the additional content associated with the mailpiece 410.

In some embodiments, the mailpiece 410 can be contained within a sleeve (not shown), such as a faraday envelope, that shields the identifier tag 412 from connecting to a nearby Bluetooth, RF, NFC, or other similar device. When the recipient 470 removes the mailpiece 410 from the shield sleeve, the identifier tag 410 can be enabled to interact with the mobile computing device 472.

In some embodiments, the identifier tag 412 can interact with an in-home communications device 474, such as Amazon Echo with Alexa, Google Home, Siri, Cortana, and the like. For example, the identifier tag 412 can encode a command for the in-home communications device 474 which can order an item associated with the mailpiece, provide a coupon or discount for an order, or which will cause the in-home communications device 474 to call up websites, audio, and the like. in some embodiments, the mailpiece 410 can have printed thereon a custom phrase useable with an in-home communication device 474 that the recipient 470 can speak or input to the in-home communication device 474 to obtain a discount, coupon, promotion, or other benefit from a supplier associated with the mailpiece 410.

In some embodiments, the mailpiece 410 and the identifier tag 412 can communicate with the in-home communications device to provide offers, services, and the like. For example, a merchant can send a Bluetooth enabled mailpiece 410 to a recipient. When the mailpiece 410 having the Bluetooth identifier tag 412 come into the recipient's home, the identifier tag 412 can communicate with an in-home communications device 474. When the recipient is shopping on-line for merchandise, goods, or services provided by the merchant who sent the mailpiece 410, the identifier tag 412 can provide a signal to the in-home communications device 474 to provide a discount for the merchant's products, goods, or services. This can occur when the device used for on-line shopping, computer, tablet computer, smartphone, etc., is connected to the same home network as the in-home communications device 474. The in-home communication device 474 can provide a code or identifier from the identifier tag 412 to a merchant's website or another website to provide the offer or discount.

In some embodiments, the identifier tag 412 can navigate the mobile computing device 472 to a website to order an item advertised on the mailpiece 410. The actions taken by the recipient 470 and/or the mobile computing device 472 can be recorded and stored at the central hub 110, and/or can be transmitted to or accessed by the sender 460.

In some embodiments, the identifier tag 412 can operate with Bluetooth low energy (BLE) can be used to connect to the mobile computing device 472 without the need to pair or download any additional content. In some embodiments, the identifier tag 412 can provide reminders, add calendar dates, contact information, and the like to the mobile computing device 472. For example, in some embodiments, the identifier tag 412 can create a calendar appointment corresponding to a sale or special offer, upcoming product release, or other event associated with the content of the mailpiece 410. In some embodiments, the identifier tag can cause a contact, such as an address and phone number corresponding to an advertised business or service to be saved to the mobile computing device 472.

Figure 5:
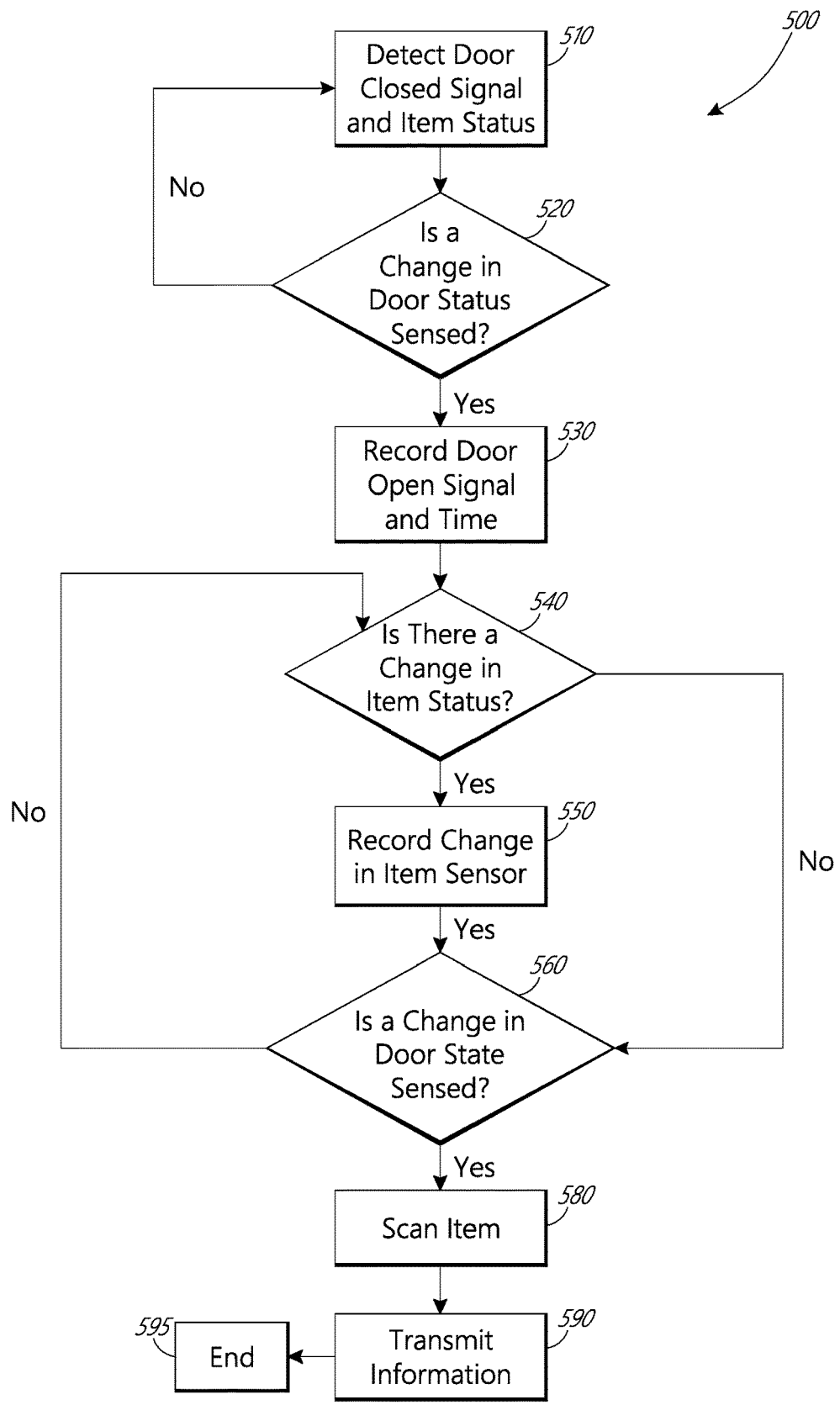
FIG. 5 is a flow chart depicting an embodiment of a process for gathering sensor data from a receptacle.

FIG. 5 is a flowchart depicting an embodiment of an exemplary process that occurs when the mailpiece 410, or any item, is delivered to the receptacle 200. A process 500 can be used to identify an event at the item receptacle 200 as a delivery or pick-up event. The process 500 begins with the door 230 of the receptacle 200 in a closed position and the first sensor 232 and the second sensor 234 are in proximity to each other to signal that the door 230 is in a closed position. The control unit 352 senses or receives a door closed signal and a signal from the item sensor 250. In the case where the receptacle 200 is empty, the item sensor 250 will detect that the signal is uninterrupted, indicating that there is nothing in the receptacle. The control unit 352 can sample the first and second sensor 232, 234 output at a desired frequency and record door status and item status at a desired frequency and generate a record to store in the memory 356. In some embodiments, the control unit 352 or processor 222 waits for a change in the door status or item status signals before recording or storing a change in door status. That is, the control unit 352 updates a door status record or table in the memory 356 only when the first and second sensors 232 and 234 change state of such as changing from coupled to uncoupled. The first and second sensors 232, 235 can also send a door status signal, such as a closed or open signal. The door status can also be recorded in the memory 356 along with a time the event or door 230 status was sensed or transmitted.

The process 500 moves to decision state 520, where the control unit 352 looks for a signal indicating a change in door status. If no change in the door status is sensed, the process 500 returns to block 510.

If a change in door status is sensed, the process 500 continues to block 530, where the door open status is recorded along with a time at which the door open signal was sensed. For example, when the delivery resource 430 opens the door 230 of the receptacle 200, the first sensor 232 and the second sensor 234 are moved out of alignment or proximity, are magnetically decoupled, or an IR, laser, photoelectric, or other signal is interrupted. The first and second sensor 232, 234 detect the door 230 is open, and transmit the door open signal to the control unit 352. The transmission of the door open signal indicates that a change in door status has been detected. The control unit 352 can record a change in door status, and can also record a door status, either open or closed, and an associated time.

The process then moves to decision state 540 wherein the control unit 352 determines whether there has been a change in item status as indicated by the item sensor 250. If the item sensor 250 detects a change in item status, such as due to changing the state of the item sensor 250, as can happen as when an item interrupts the item sensor 250, the item sensor generates a signal and transmits the signal to the control unit 352 indicating the change in state of the item sensor 250. The item sensor 250 can also send a signal whether the item sensor 250 signal was interrupted, indicating the presence of an item in the receptacle 200, or whether the signal is uninterrupted, indicating the absence of an item in the receptacle 200. If a change in state of the item sensor 250 occurs, the process 500 moves to block 550 wherein the control unit records the change in state of the item sensor 250 for the receptacle 200 and the associated time. The presence or absence of an item and the time of the event can be recorded in the control unit 352.

For example, and as will be described in greater detail below, a delivery event can be identified when a door open signal is detected, and thereafter an interruption in an item sensor 250 signal is detected, and the interrupted signal remains interrupted. This indicates that an item 202 is in the item receptacle 200. A pick-up event can be identified when a door open signal is detected, and thereafter an interrupted item sensor 250 signal is removed, and the item status sensor signal returns to an uninterrupted state. This indicates an item 202 has been removed from the item receptacle 200.

If no change in state of the item sensor 250 is detected in decision state 540, then the process moves to decision state 560, wherein the control unit 352 looks to see whether there has been another change in the door status. The determination of a change in door status, or an indication of door status as being either open or closed can be similar to that described above with regard to block 520.

If no change in door status is detected, the process returns to decision state 540 and awaits a change in item status. If a change in door status is detected in decision state 560, such as a closed signal is sensed following the open signal, the process 500 moves to block 580, wherein the scanner 240 activates to scan the item in the receptacle 200. The scanner 240 scans the item and reads a computer readable code or takes an optical image of the item, and transmits the information encoded in the computer readable code or the image of the item to the control unit 352. In some embodiments, in state 540 the item sensor 250 may not detect an item in the receptacle 200, and thus, the scanner need not be activated to scan the receptacle 200. In some embodiments, the receptacle may not comprise an item sensor 250, and the scanner 240 is activated following each open and close cycle of the door to detect whether an item is in the receptacle 200.

If the scanner 240 newly detects an item after an interruption in the item sensor 250, a delivery event can be identified. If, after an interruption in the item sensor 250, the scanner 240 is activated, but no item 202 is identified in the item receptacle 200, a pick-up event can be identified, as will be described in detail below with regard to FIG. 6.

The process 500 moves to block 590, wherein event information is transmitted to the central hub 110. In some embodiments, the control unit 352 transmits information about the door status and changes, the item status, and information obtained from the scanner 240. The control unit 352 can also transmit a unique serial number or unique identifier corresponding to the cabinet 300 on which the control unit 352 is located. Where a cabinet 300 comprises a plurality of receptacles 200, each receptacle 200 can be assigned a unique identifier that is recorded in the control unit 352 along with any status signals from sensors in that receptacle 200. The unique identifier of the receptacle 200 is transmitted with the door status, item status, and scanner information to identify the receptacle 200 for which the door status and item status have been transmitted. In some embodiments, the item sensor 250, the first sensor 232, the second sensor 234, and/or the scanner 240 can each be assigned or associated with a unique identifier, such as a serial number, which can be transmitted together with the door status, item status, and scanner information. This enables the central hub 110 to identify which receptacle the sensor information is received from, as the central hub 110 has a record of the unique identifiers for the item sensor 250, the first sensor 232, the second sensor 234, and/or the scanner 240, and associates these unique identifiers with a particular receptacle 200, or with a particular delivery point, such as an address.

The central hub 110 can receive the information and process the information as will be described elsewhere herein. The process 500 then ends at block 595.

In some embodiments, the event information is transmitted to the central hub 110 as soon as it is received. For example, as soon as the door is detected as being opened, the door open signal and change in status can be transmitted or sent to the central database. In some embodiments, the control unit 352 is configured to communicate or transmit signals over a shorter range. For example, the control unit 352 is configured to transmit information to the delivery device 160 when the delivery device 160 is within a communication range of the control unit 352. In some embodiments, the control unit 352 and the delivery device 160 can communication via a Bluetooth, NFC, or any other wireless communication protocol or method. In this case, when the delivery device 160 is within the communication range of the control unit 352, the control unit 352 identifies a signal from the delivery device 160 and initiates communication. The control unit 352 may be awakened by a signal from the delivery device 160 such that the delivery device 160 initiates the communication. The control unit 352 transmits the recorded event data for a specific time period, such as from the time of the last communication with a delivery device 160, or for the last 24 hours, or for any other desired time period.

In the case of the USPS, a delivery device 160 is likely to be at the receptacle 200 or cabinet 300 once a day. Thus, the control unit 352 may communicate or transmit data once a day, when the delivery device 160 is in range. The delivery device 160 can be configured to communicate the information it receives from the control unit over a cellular or wireless network connection. In some embodiments, the delivery device 160 can store the received information and transmit the received information to the central hub 110 when the delivery device 160 returns to the post office and is connected to a network, server, or other wired or wireless connection.

In some embodiments, rather than communicating item sensor and door status signals to the central database, the control unit 352 may communicate door and item status information and/or scanner information to a receiver within a residence, place of business, or other location associated with the receptacle 200. The receiver can be configured by a user, business, consumer, subscriber, or other party to send notifications via SMS, email, or other communication method when an item status changes, such as when the item status on the receptacle 200 changes. If the item status changes from an item present to an item being absent, the receiver, or the control unit 352, or the central database can communicate to a user, consumer, or subscriber that an item has been retrieved from the receptacle 200 along with a time of the event. If the item status changes from no item present to detecting an item, then the receiver, or the control unit 352, or the central database can communicate to a user, consumer, or subscriber that an item has been placed in the receptacle 200 along with a time of the event.

The central hub 110 uses the event information regarding door status, item status, and scanner information to determine what types of events have taken place and what further actions should be taken, including sending notifications.

Figure 6:
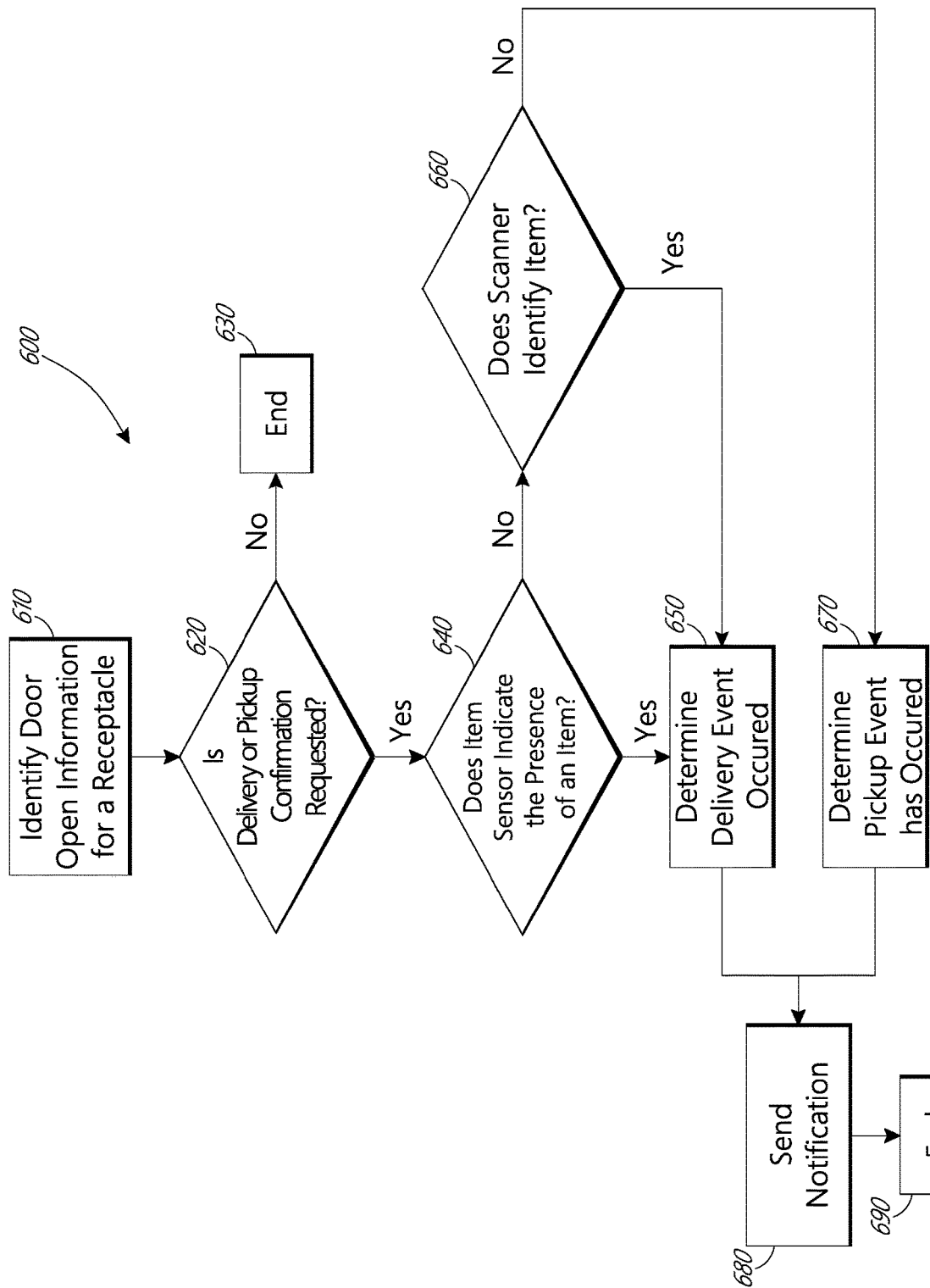
FIG. 6 is a flow chart depicting an embodiment of a process for determining whether an event was a delivery or pick-up event.

FIG. 6 depicts a flowchart of an embodiment of a process for determining what type of event, e.g., delivery or pick-up, has occurred at a receptacle 200.

Process 600 begins in block 610 wherein the central database identifies a door open signal, or a change in door status from closed to open for a receptacle 200.

The process 600 moves to decision state 620, wherein the central database determines whether the opened receptacle 200 is associated with any items for which delivery and pick-up confirmation is requested. The central hub 110 has stored item information for items for which delivery and pick-up confirmations have been requested. The central hub 110 compares door status information for the particular receptacle 200, as identified by the unique identifier of the sensors or the receptacle 200, with stored associations between unique identifiers and delivery points to identify the delivery point, such as the address, of the receptacle whose door status has changed. The central hub 110 then queries the item information for items, received from the sender interface 120, for which delivery and pick-up confirmation is requested, to determine whether the delivery point whose door status has been changed is scheduled to receive an item, or has an item intended for delivery to the delivery point.

The central hub 110 can also take into account the timing of intake of the item. for example, a certain delivery point may have 2 items intended for delivery to the delivery point, only one of which has requested confirmation of pick-up or delivery. In this case, the central hub 110 can look at the location of the receptacle 200, the location of the intake point of the item for which delivery and pick-up confirmation is requested, and information about the item location in the item tracking system 130. If the receptacle whose door status has changed is scheduled to receive an item for which confirmation of delivery or pick-up has been requested, but the item tracking system 130 shows that the item is not yet out for delivery by a delivery resource, or that the item for which delivery or pick-up confirmation was requested could not logistically be at the delivery point yet, then the central hub 110 can determine that the door open event is not associated with the item for which delivery or pick-up confirmation has been requested. In this case, the process will move to block 630 and end.

If the central hub 110 does not find an item for which delivery or pick-up confirmation has been requested intended for the receptacle, the process also moves to block 630 and ends.

If the central hub 110 identifies an item for which delivery or pick-up confirmation has been requested, and the item tracking system 130 shows that the item has been sent with the carrier or the delivery resource 430, or is out for delivery, then the process 600 moves to decision state 640.

In decision state 640 the central hub 110 analyzes the item status from the item sensor 250 for the receptacle 200 whose door 230 has been opened. The central hub 110 can look at the item sensor 250 status from a time before the door open signal and from a time after the door open signal was received. If the information from the item sensor 250 shows no item in the receptacle 200 before the time of the door open signal, and shows a change in the item sensor 250 state (to sensing an item) at a time after the door open signal and before the door close signal was received, then the process 600 moves to block 650 and indicates that a delivery event has occurred.

After it has been determined that a delivery event or a pick-up event has occurred, the determination is stored or recorded in blocks 650 and 670, the process 600 moves to block 680 wherein the central hub 110 sends notifications regarding the delivery event or the pick-up event. The item information received from the sender interface 120 can identify the sender and the recipient and can provide a notification preference for notifying the sender and the recipient of the delivery or pick-up event. The central database can notify the sender or recipient of the occurrence of delivery or pick-up and the time of the delivery or pick-up via a telephone call, an SMS text message, an email, a social media notification, a notification on an application on a computing device, such as a personal computer or smartphone, or the like, according to the sender and recipients preferences. The central hub 110 can provide real-time notifications to senders and recipients where the control unit 352 provides real-time information regarding door and item sensor status. In some embodiments, the central hub 110 provides batch information or notifications, such as where the control unit 352 transmits door and items sensor information in batches. Following notifications, the process 600 moves to block 690 and ends.

The central hub 110 can also compile data regarding delivery and pick-up times and compile service and performance metrics. The central hub 110 can also analyze delivery and pick-up times to determine when the best time to reach a recipient, or to find a recipient at home may be.

The following examples show how it can be determined whether an event is a delivery or pickup event. The events below can be similar to the process depicted in FIG. 6. For example, the first and second sensor 232 and 234 or the item sensor 250 or both can be assigned serial no. 23190367765 which is known to be associated with 12 Happy Valley Ct., Plano Tex.

The door open data may show events at:
12:30:56
15:12:12
18:32:21
06:32:23

The central hub 110 would know that the delivery resource delivered at 12:30:56 due to other systems or delivery device 160 GPS breadcrumb data (as described below), and that the recipient picked up the item at 15:12:12 on the previous day.

For a cabinet 300 comprising multiple receptacles 200, the data for the cabinet 300 may show the following times associated with sensors having serial numbers as shown below:
231907907—23:12:32, 08:59:02
376918662—18:07:12, 08:59:02
918269901—15:06:34, 08:59:02
129846919—14:17:08, 12:37:21, 08:59:02
219836989—09:03:21, 08:59:02,
437312908—08:59:02

Because multiple item receptacles 200 have door open signals at the same time, the central hub 110 can determine that the delivery resource 430 delivered items to the cabinet at 08:59:02. The central database 100 can also determine that the other times can be when recipient picked up the items, or that the items have not yet been picked-up, for example, sensor ID 437312908 shows only the delivery time, and no subsequent door open time. In some embodiments, the item sensor 250 information need not be analyzed, and the central database can analyze only door status information to determine delivery and pick-up events as described herein.

In some embodiments, the cabinet 300 may be accessible by a delivery resource 430 using a common door which allows access to all receptacles 200 in the cabinet 300. For example, the cabinet 300 may have a rear door which allows access to the rear of each receptacle. This door can have a door status sensor that indicates that the rear door is opened, and can record a door open event for each of the plurality of receptacles 200 in the cabinet 300. The central hub 110 can examine such an event and determine that only a delivery resource can open the rear door, and so this event must be a delivery event. Also, the central hub 110 can identify that an item sensor 250 status change occurring soon after this door open event indicates a delivery.

If the receptacle 200 does not have an item sensor 250, or if the information from the item sensor 250 is inconclusive, defective, missing, or otherwise not useable, and if the receptacle 200 comprises an item scanner 240, then the process moves to block 660, wherein it is determined whether the scanner 240 detected and scanned an item in the receptacle. The central hub 110 analyzes the information from the scanner 240 to determine whether an item was scanned, and what the item information for the scanned item is. If the item scanner detects an item, then the process 600 moves to block 650, wherein it is determined that a delivery event has occurred. In some embodiments, the scanner 240 can operate in conjunction with the item sensor 250.

In some embodiments, where the item sensor 250 information is not available, such as where an item sensor 250 is not installed, or is defective, or simply in addition to the item sensor 250 information, a delivery event of the item 202 can be confirmed by analyzing the information from the delivery device 160, such as GPS location data, time data, item scan data, and the like, in conjunction with the door open signal. To illustrate, the delivery device 160 provides location data, which can be called GPS breadcrumb, and can show the path taken by the carrier with the delivery device 160. On a door open signal from a particular receptacle, the central hub 110 determines the identity of the delivery device 160 which is assigned to deliver items to the particular receptacle 200 for which the door open signal has been received. The central hub 110 accesses the location data or breadcrumb data for that delivery device 160, and identifies the time at which the delivery device was in a geographic vicinity of the receptacle 200 for which the door open signal was received. If the time of the door open signal is within a time window, or corresponds to a time that the delivery device 160 was at or near the receptacle 200, the central hub 110 can determine that a delivery event has taken place.

In some embodiments, the delivery device 160 can scan an item prior to depositing the item 202 in the receptacle 200. The GPS location of the delivery device 160 at the time of the scan of the item intended for delivery to a particular item receptacle 200 can be stored at the delivery device, transmitted to the control unit 352 and/or the central hub 110. The scan event and the GPS data, in combination with a door open signal, an item status signal, or any combination of the above can be interpreted as a delivery event, because the GPS location and the item scan are indicative of a carrier in the vicinity of the receptacle 200, and the door open event and the item sensor 250 signal are within a time window of the item scan event by the delivery device 160.

If the breadcrumb data for the delivery device 160 shows that the delivery device 160 was at or near the receptacle at a time before the time of the door open signal, and if there was an item for delivery to that receptacle on that day, then the central hub 110 can determine that the door open event was a pick-up event.

Breadcrumb data can be used in conjunction with item sensor 250 information. For example, if the breadcrumb data from the delivery device 160 shows that the delivery device 160 was in a specific geographic area, such as a geofence, associated with the receptacle 200, or was near the receptacle 200 at a time corresponding to when the receptacle 200 detected an item via item sensor 250, or detected a change in state of the item sensor 250, then a delivery can be confirmed.

In some embodiments, the scanner 240 information can be used in lieu of information from the item sensor 250 and the door sensor. For example, if the central hub 110 receives scan information for an item from a scanner 240 in a receptacle 200, the item information from the scanner 240 is compared to the item information for items for which delivery and pick-up confirmation has been requested. If the item information from the scanner 240 matches an item for which delivery or pick-up confirmation is requested, the central database can determine that a delivery event has taken place, without analyzing door open data and item sensor 250 data.

If the item sensor does not indicate the presence of an item, or if the scanner 240 does not detect an item, the central processor can evaluate the item sensor 250 status at a point before the time of the door open signal and at a time after the time of the door open signal. If the item sensor 250 indicated that an item was present in the receptacle 200 before the time of the door open signal, and that the item sensor 250 status changed after the time of the door open signal and before the time of a door closed signal, the process 600 can move to block 670, wherein the central hub 110 determines that a pick-up event has occurred.

In some embodiments, the delivery resource 430 will scan the computer readable code on an item using the delivery device 160 prior to placing the item in the receptacle 200. The central hub 110 will process the item information from scanned computer readable code from the delivery device 160 and cross reference the item information with the information from the receptacle regarding the opening of the door 230 of the receptacle 200. If the processor 114 identifies an open signal from the receptacle 200 to which the item was to be delivered at or near the same time as a scan signal from the delivery device 160 of the delivery resource 430 to which the item had been assigned, then the processor 114 and the central hub 110 identifies that the item was delivered. In this instance, the central hub 110 will identify that a delivery event has occurred.

Figure 7:
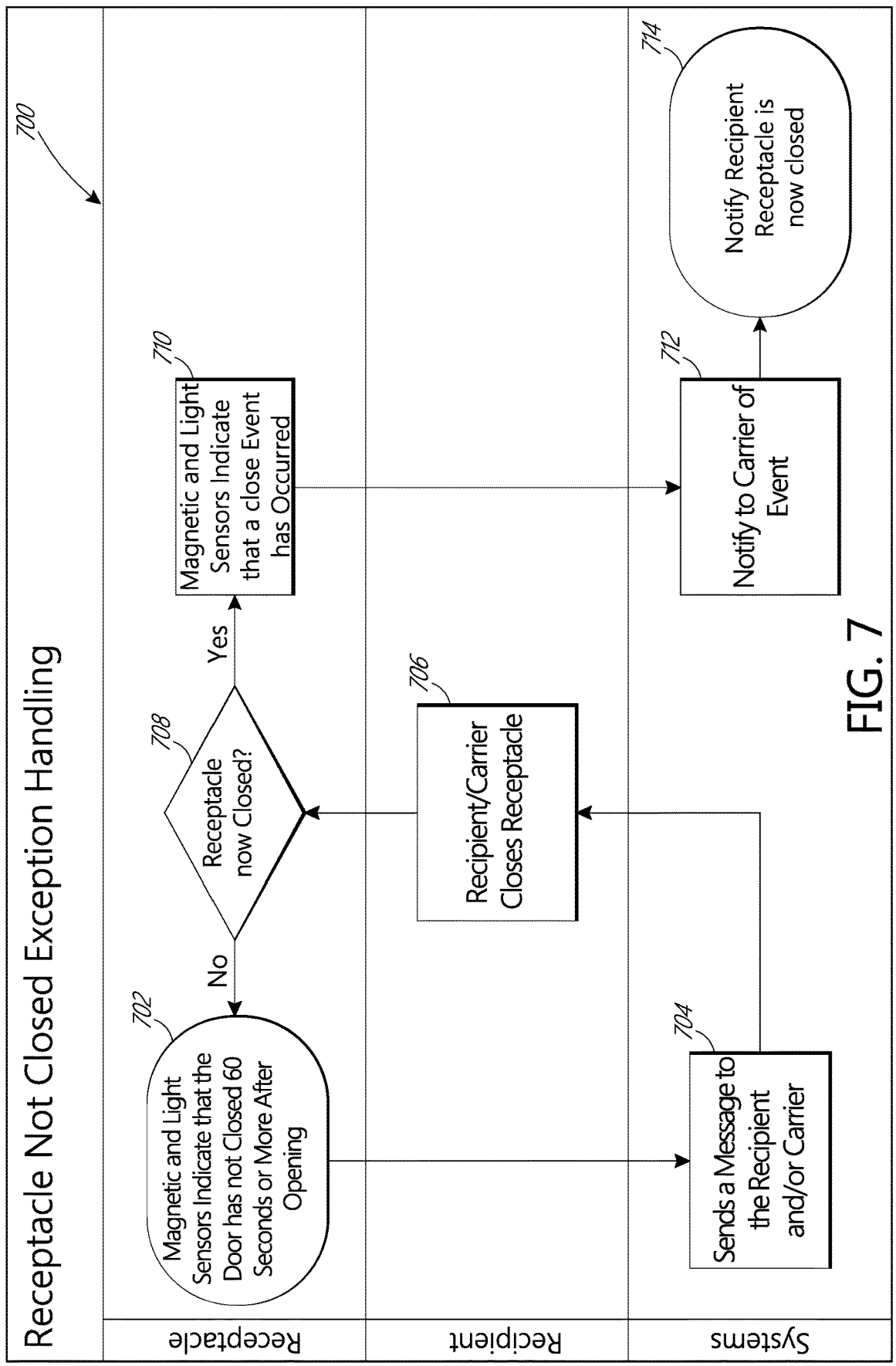
FIG. 7 is a process flow diagram of exception handling for a receptacle door that is not closed.

FIG. 7 illustrates an embodiment of a process flow diagram for a delivery and pick-up at a receptacle. In a process 700, data flows and communications regarding an exception for a door 230 not being closed are depicted. The process 700 begins in step 702, wherein the first and second sensors 232, 234 indicate that the door 230 on the item receptacle 200 has been opened. The processor 222, or the control unit 352 starts a timer, or periodically checks the door status. For ease of discussion, control unit 352 will be referred to in this and subsequent figures, but it is understood that the functionality of the control unit 352 can be provided by the processor 222 and its related components.

If the control unit 352 detects that the door 230 has been open for a specified period of time, or longer, such as 60 seconds, 2 minutes, 5 minutes, or any other desired time, the process 700 moves to step 704, wherein the control unit 352 communicates to the central hub 110 that the door 230 has been open for the specified period of time. In some embodiments, the control unit 352 attempts to communicate with the delivery device 160 directly, or through the control hub 160 to notify the carrier that the door 230 has been left open. In some embodiments, this communication to the delivery device 160 can be sent when the control unit 352 or the central hub 110 has determined a delivery event has happened recently, such as within the last 5 minutes, the last 30 minutes, or any other desired time. In some embodiments, if the central hub 110 or the control unit 352 has determined that a pick-up event has just occurred, the central hub 110, or the control unit 352, or both communicate with the recipient, such as with the mobile communication device 472 that the door 230 is open. This can inform the recipient that he or she left the door 230 open, or that there is some problem with the door, and instruct the recipient to close the door 230.

The process 700 moves to step 706, wherein the recipient or the carrier or some other party closes the door 230 or attempts to close the door. In some embodiments, step 706 can be a predetermined wait time after communicating the door open status. For example, step 706 can be a 1 hour wait, a 2 hour wait, a 12 hour wait, a 24 hour wait, or any other desired time period. In some embodiments, the wait time can be adjusted according to the time of day when the door open signal was detected. After the wait period, another communication to the recipient or the carrier, or another party identified by the recipient is sent. If the door is left open at night, a repeat message can be sent sooner, so as to try and get the door 230 closed sooner. If the door 230 is left open in the morning, and the carrier is expected within an hour, or another time period, the control unit 352 or the central hub 110 may not send a repeat message, because the carrier will be along soon, and can shut the door 230.

The process 700 moves to decision state 708 wherein it is determined if the door 230 is now closed. The first and second sensors 232, 234 can be rechecked in a step 710 to determine if a door closed signal is present.

If the door 230 is detected as being closed, the process moves to step 712, wherein the control unit 352 communicates the change to the central hub 110, to the carrier, or both. The process 700 moves to step 714, wherein the recipient is notified that the door 230 is now closed, and the process ends.

FIG. 8 is a process flow diagram depicting an embodiment of a process of IR beam exception handling. The IR beam can refer to the beam 252 generated by the item sensor 250. The process 800 begins when the control hub 352 identifies that the door 230 is closed, but that the beam 252 is broken. In some embodiments, the item sensor 250 is placed higher in the item receptacle so that the beam 252 is broken when an item 202 is inserted, such as a letter, but is not broken when the item 202 rests on a floor of the internal volume 220 of the item receptacle 200. In this event, an indication that the beam 252 is broken but the door is closed can indicate that the recipient did not pick up everything from the item receptacle 200, that something is stuck or not properly within the item receptacle 200.

The process 800 moves to step 802 wherein a message is sent regarding the broken beam 252. In some embodiments, the message can be sent to the carrier, or to the recipient, or both. For example, if the carrier has recently been at the item receptacle 200, as identified by GPS breadcrumbs from the delivery device 160, or based on a scan event from the delivery device for an item 202 deposited into the item receptacle 200, the message can be sent to the carrier, and not to the recipient. If a pick-up event has just occurred, as described elsewhere herein, the message can be sent to the recipient and not to the carrier.

In some embodiments, an item 202 can be large enough that the beam 252 will be broken by the item 202 while the item 202 awaits pickup. In this situation, the control unit 352 can determine that the reason the beam 252 is broken and the door is closed, is because a delivery event just occurred, or that the pickup event has not yet occurred. If the control unit 352 determines a specified pick-up time period has passed, such as 12 hours, one day, or more, the control unit 352, and/or the control hub 110 can send a reminder to the recipient to pick up the item 202, and the exception or error message will not be sent.

The process moves to step 806 wherein the carrier or the recipient investigates what is breaking the beam 252. The step 806 may also be a wait time similar to step 706 described above. The process 800 moves to decision state 808, wherein it is determined whether the beam 252 is now unbroken and the door 230 is closed.

If the beam 252 is unbroken and the door 230 is closed, the process moves to step 810 wherein the control unit sends a message to the control hub 110 that the beam exception or error is cleared. The process 800 moves to step 812 wherein the carrier and/or the recipient are notified that the beam exception or error is cleared, and the process 800 ends.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The logical blocks, modules and flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a multicore processor, a system on a chip, a Pentium® Pro processor, a 8051 processor, a MIPS® processor, a Power PC® processor, Alpha® processor, a microcontroller, an Intel CORE i7®, i5®, or i3® processor, an AMD Phenom®, A-series, or FX processor, or any other microprocessor or microprocessor array. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, .NET (e.g., C #), Java, HTML, or other programming language and run under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

We claim:

1. An item receptacle comprising:
   a plurality of sides enclosing an internal volume;
   a door moveably connected to one of the plurality of sides, the door configured to open and close to allow access to the internal volume;
   a door sensor configured to detect when the door is opened, wherein the door sensor is an electromagnetic sensing system which detects an interruption or continuity of a signal to determine the position of the door;
   a processor in communication with the door sensor, the processor configured to receive a signal corresponding to a change in state of the door sensor;
   a communication device in communication with the processor, the communication device configured to communicate with a central hub;
   a scanner connected to one of the plurality of sides, and disposed within the internal volume, the scanner in communication with the processor, the scanner configured to read a computer readable code on an item within the internal volume; and
   an item sensor disposed within the internal volume, the item sensor comprising an emitter adapted to emit a beam and a detector to detect the beam, and to identify a change in state of the beam, the item sensor in communication with the processor;

wherein the processor is configured to store a change in state of the door sensor and transmit, via the communication device, the change in state of the door sensor to the central hub;

wherein when the scanner detects an item after an interruption in the item sensor, the central hub is configured to identify a delivery event; and wherein when after an interruption in the item sensor the scanner is activated, but no item is identified in the item receptacle, the central hub is configured to identify a pick-up event.

2. The item receptacle of claim 1, wherein the processor is configured to store a change in state of the beam and to transmit the change in state of the beam to the central hub.

3. The item receptacle of claim 1, wherein the processor is configured to instruct the scanner to scan the internal volume to read the computer readable code on the item disposed within the internal volume.

4. The item receptacle of claim 3, wherein the processor is configured to transmit a signal indicative of the computer readable code to the central hub.

5. The item receptacle of claim 1 further comprising a wireless communication device configured to communicate with an identifier tag on an item disposed within the internal volume.

6. The item receptacle of claim 1 further comprising a power supply connected to the processor and the door sensor, the power supply comprising a solar panel attached to an external surface of the item receptacle.

7. A system comprising:
an item receptacle comprising:
a plurality of sides enclosing an internal volume;
a door configured to open and close to allow and deny access to the internal volume;
means for detecting a change in state of the door, wherein the means for detecting a change in state of the door is an electromagnetic sensing system which detects an interruption or continuity of a signal to determine the position of the door;
means for detecting the presence of an item;
means for detecting a signal from the means for detecting the presence of an item;
means for determining whether an item delivery or pick up event has occurred based on the detected change in state of the door and the detected item presence; and
means for causing a notification of a delivery event to be sent to a recipient of an item,
wherein if the means for detecting the presence of an item detects the presence of an item after the means for detecting a change in state of the door detects an interruption of a signal, the means for determining is configured to identify a delivery event, and
wherein if after the means for detecting a change in state of the door detects an interruption of a signal the means for detecting the presence of an item is activated, but no item is identified in the internal volume, the means for determining is configured to identify a pick-up event.

8. The system of claim 7, wherein the means for detecting whether an item delivery or pick up event has occurred comprises a processor.

9. The system of claim 7, wherein the means for causing notification of a delivery event comprises a wireless communication device configured to communicate with an identifier tag on an item disposed within the item receptacle.

10. The system of claim 7 further comprising a power supply connected to the means for detecting where an item delivery or pick up event has occurred and the means for detecting a change in state of the door, the power supply comprising a solar panel attached to an external surface of the item receptacle.

11. An item receptacle comprising:
a plurality of sides enclosing an internal volume;
a door moveably connected to one of the plurality of sides, the door configured to open and close to allow access to the internal volume;
a door sensor configured to detect when the door is opened or closed, wherein the door sensor is an electromagnetic sensing system which detects an interruption or continuity of a signal to determine the position of the door;
a processor in communication with the door sensor, the processor configured to receive a signal corresponding to a change in state of the door sensor when the door is opened or closed;
a communication device in communication with the processor, the communication device configured to communicate with a central hub, wherein the processor is configured to store a change in state of the door sensor and transmit, via the communication device, the change in state of the door sensor to the central hub;
a scanner connected to one of the plurality of sides, and disposed within the internal volume, the scanner in communication with the processor, the scanner configured to read a computer readable code on an item within the internal volume; and
a wireless communication device disposed within the internal volume and configured to communicate with an identifier tag on an item disposed within the internal volume,
wherein if the scanner detects an item after an interruption in the item sensor, the central hub is configured to identify a delivery event, and
wherein if after an interruption in the item sensor the scanner is activated, but no item is identified in the item receptacle, the central hub is configured to identify a pick-up event.

12. The item receptacle of claim 11, wherein the processor is configured to instruct the scanner to scan the internal volume to read the computer readable code on the item disposed within the internal volume.

13. The item receptacle of claim 12, wherein the processor is configured to transmit a signal indicative of the computer readable code to the central hub.

14. The item receptacle of claim 11, wherein the processor is further configured to identify whether a delivery or pick-up event has occurred based on the change of state of the door sensor and the reading of the computer readable code by the scanner.

15. The item receptacle of claim 11 further comprising a power supply connected to the processor and the door sensor, the power supply comprising a solar panel attached to an external surface of the item receptacle.

* * * * *